(12) United States Patent
Clark

(10) Patent No.: US 7,962,287 B2
(45) Date of Patent: Jun. 14, 2011

(54) METHOD AND APPARATUS FOR OPTIMIZING MAGNETIC SIGNALS AND DETECTING CASING AND RESISTIVITY

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 232 days.

(21) Appl. No.: 11/781,704

(22) Filed: Jul. 23, 2007

(65) Prior Publication Data
US 2009/0030615 A1    Jan. 29, 2009

(51) Int. Cl.
*G01V 1/40* (2006.01)
*G01V 3/18* (2006.01)
*G01V 5/04* (2006.01)

(52) U.S. Cl. .......................................................... 702/7

(58) Field of Classification Search .................. 702/7, 8, 702/115, 9, 141; 324/331, 333, 346, 366; 175/45
See application file for complete search history.

(56) References Cited

U.S. PATENT DOCUMENTS

| | | | |
|---|---|---|---|
| 4,372,398 A | 2/1983 | Kuckes | |
| 4,906,930 A * | 3/1990 | Nakane et al. | 324/248 |
| 5,305,212 A | 4/1994 | Kuckes | |
| 5,343,152 A | 8/1994 | Kuckes | |
| 7,812,610 B2 * | 10/2010 | Clark et al. | 324/346 |
| 2005/0218898 A1 * | 10/2005 | Fredette et al. | 324/342 |
| 2007/0126426 A1 * | 6/2007 | Clark et al. | 324/326 |
| 2007/0247330 A1 * | 10/2007 | Clark | 340/854.6 |
| 2008/0156534 A1 * | 7/2008 | Clark et al. | 175/45 |
| 2009/0164127 A1 * | 6/2009 | Clark | 702/7 |

OTHER PUBLICATIONS

D. Lee et al., "First U-tube Well connects Horizontal Wells," Drilling Contractor, pp. 71-77 (Sep./Oct. 2005).

* cited by examiner

*Primary Examiner* — Michael P Nghiem
(74) *Attorney, Agent, or Firm* — John Vereb; Dave R. Hofman

(57) ABSTRACT

A wellbore tool for optimizing magnetic signals is provided. The wellbore tool has a tool body and an electric current driving device with an insulated gap on the downhole tool body. The electric current driving device generates electric current across the gap. The wellbore tool has a a magnetometer capable of measuring a magnetic field.

9 Claims, 11 Drawing Sheets

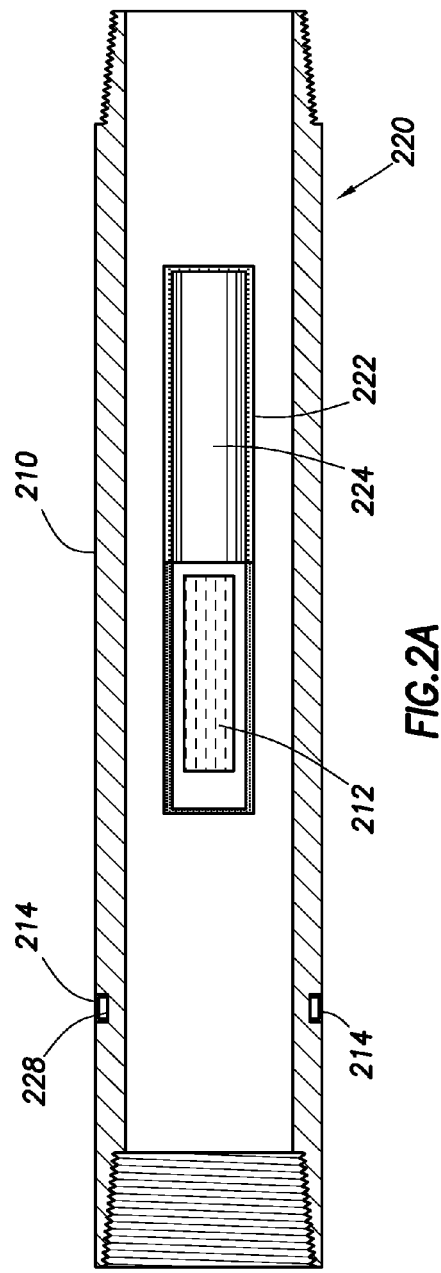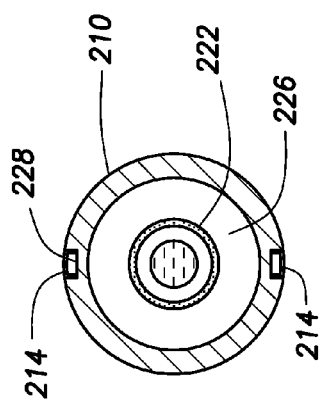

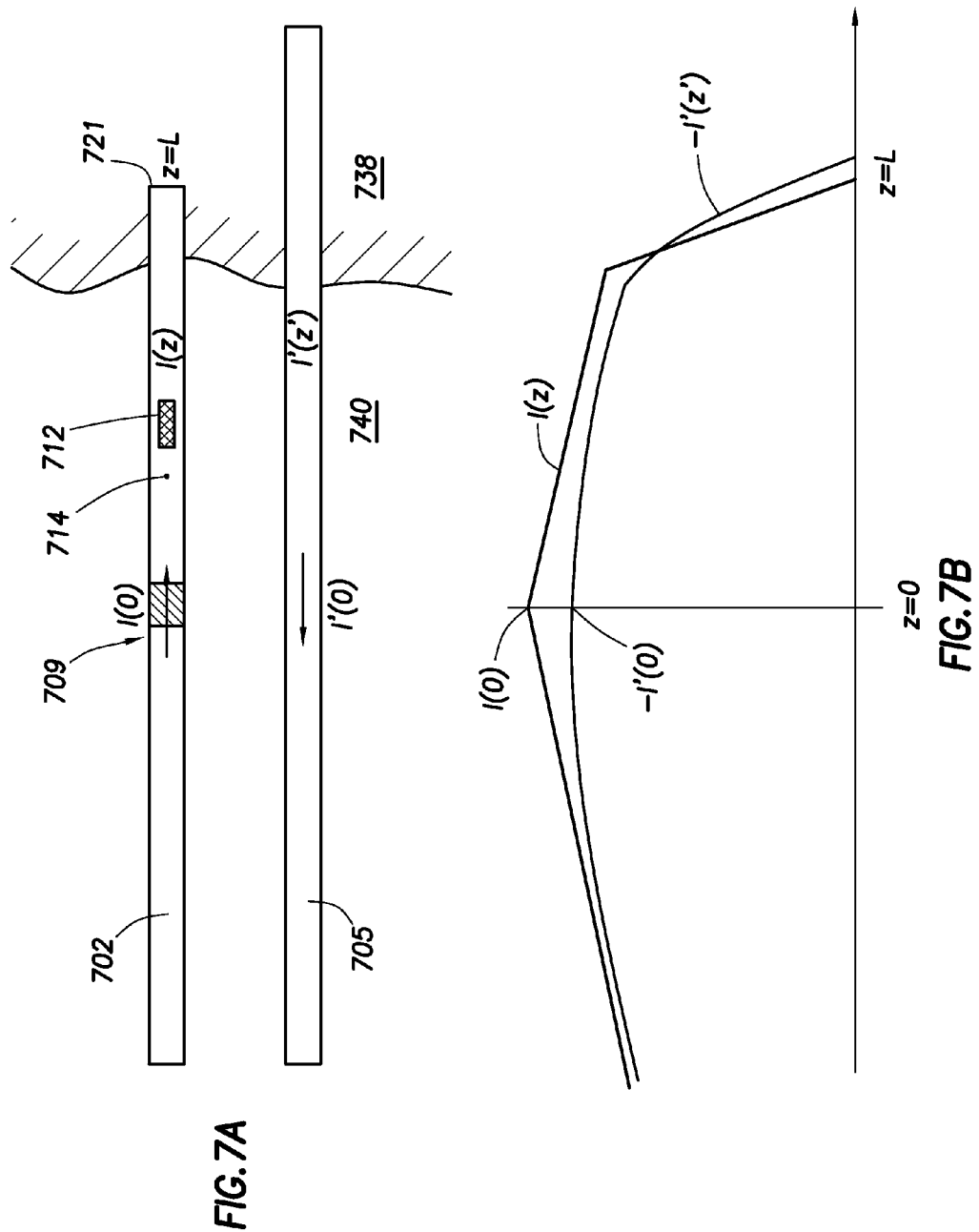

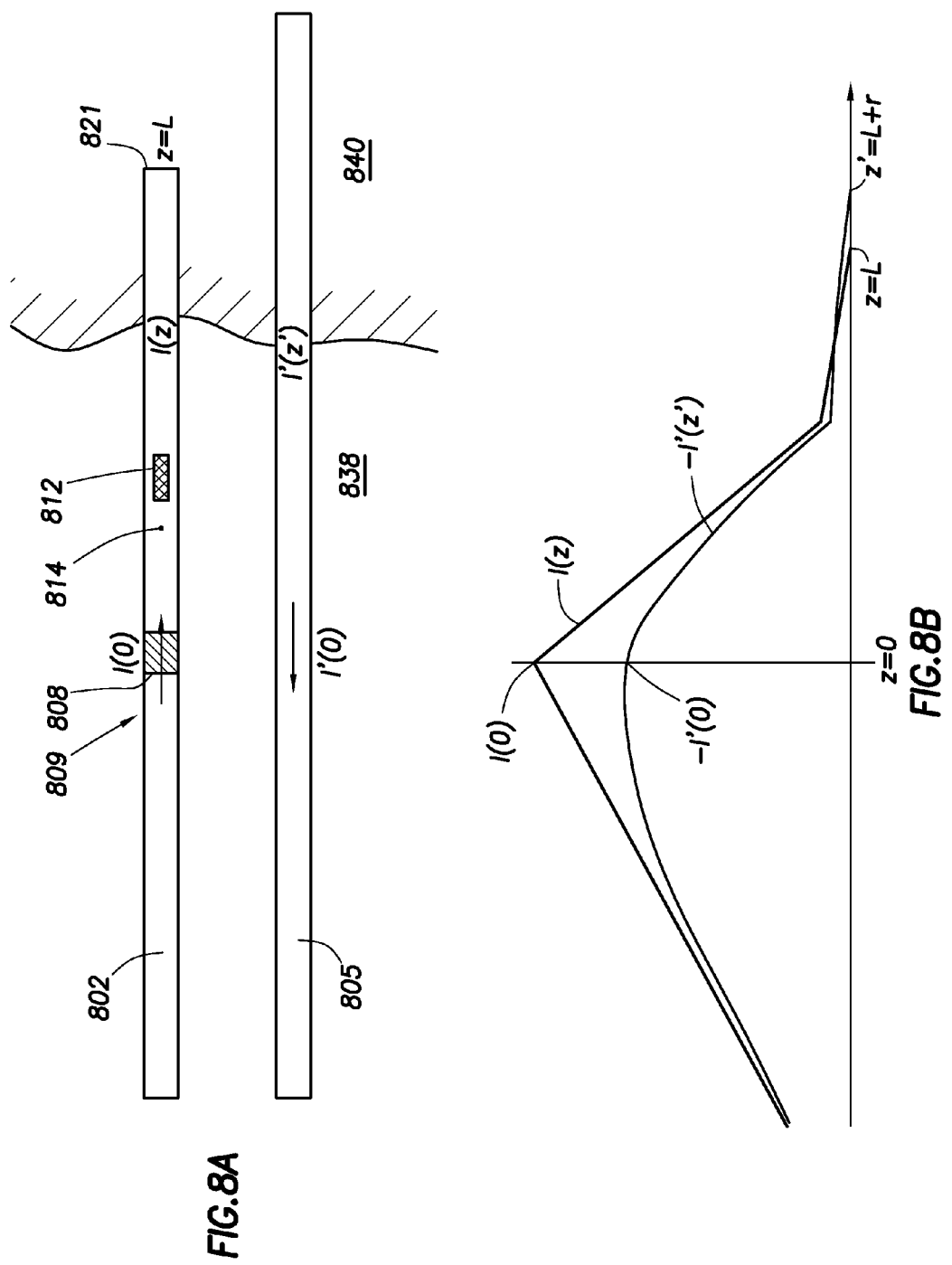

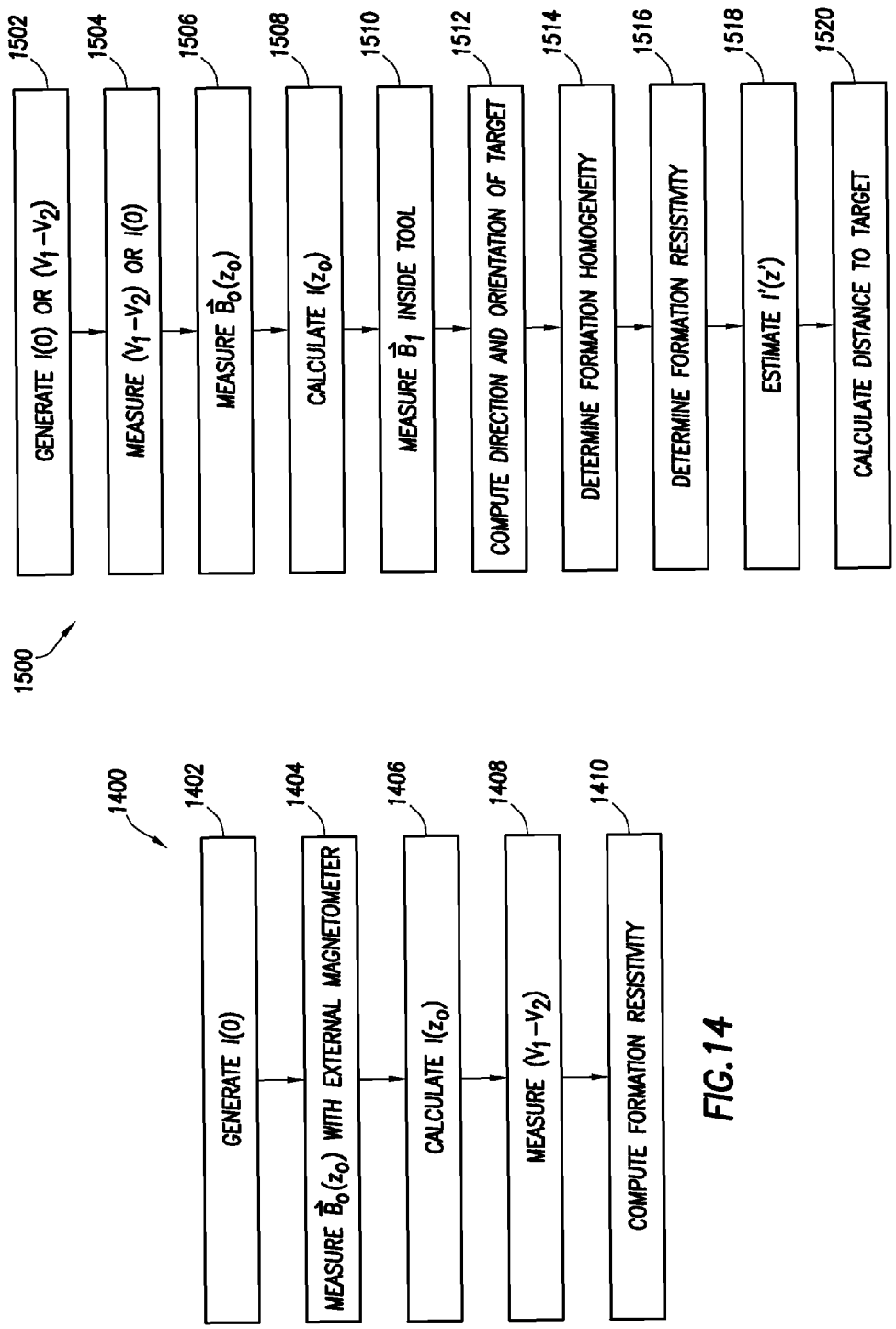

METHOD AND APPARATUS FOR OPTIMIZING MAGNETIC SIGNALS AND DETECTING CASING AND RESISTIVITY

BACKGROUND OF INVENTION

1. Field of the Invention

Embodiments disclosed herein generally relate to well drilling operations and more particularly to locating a casing or drill string of a first wellbore from a second wellbore while drilling the second wellbore. More specifically, embodiments disclosed herein relate to electric current and magnetic signals used in locating or detecting casing.

2. Background Art

In various drilling operations it is desirable to locate adjacent wellbores. Examples of drilling operations that may require locating adjacent wellbores include relief well drilling, drilling U-shaped wells, and steam assisted gravity drainage (SAGD) operations. From time to time, wells blowout, and it is desired to kill the well subsurface. Thus, it is necessary to accurately position the first well while drilling the second intercepting relief wellbore. Another common application for locating adjacent wellbores occurs when drilling a second wellbore substantially parallel to a first wellbore such as in SAGD wells.

Current methods for locating casing (or drill string) of a first wellbore use wireline tools. Conducting locating surveys utilizing wireline tools, and relying on those results, has significant drawbacks. For example, using wireline equipment increases rig time and costs. Further, wellbore location information is only obtained periodically with these wireline methods. This unavailability to have constant, timely and accurate data can result in significant and costly errors.

Intercepting an exiting wellbore with a second well is used for killing blow-outs and for drilling "U-shaped wells." In a blow-out, the first well encounters an unexpectedly high pressure formation during drilling. If the weight of the drilling mud is too low, the formation pressure exceeds the borehole pressure and fluids from the formation enter the wellbore in an uncontrolled manner. The formation fluids blow the drilling mud out of the annulus between the formation and the drill string. Because the formation fluids are less dense than the mud, the pressure at the surface can become very high. This is a serious situation that may endanger people and the environment and that may damage the drilling rig and the reservoir.

If standard drilling control methods (e.g., "weight and wait") cannot reestablish a greater pressure in the borehole than in the formation, the extreme measure of drilling a relief well is undertaken. A second wellbore is drilled from an offset location and attempts to intercept the first well a short distance above the blown-out formation. Wireline magnetic ranging methods are used when a drilling the relief well. The BHA in the second well is periodically removed and a wireline tool is run in the open hole of the relief well (see U.S. Pat. No. 4,372,398) to determine the distance and direction to the well to be intercepted. The wireline tool of U.S. Pat. No. 4,372,398 has two widely spaced, current injecting electrodes, and a sonde with a magnetometer located below them. The injected current concentrates on the drill string in the first well, and the resulting magnetic field is measured with the magnetometer to determine the relative bearing of the first well with respect to the second well. By taking several bearings at different locations in the relief well, it is also possible to determine the distance to the blow-out. Eventually, the relief well is able to intercept the blow-out, but this may require a large number of trips, i.e., the drill string is removed and a wireline magnetic ranging tool is run into the open hole.

Each trip may require one or more days of rig time, so the process can be very slow and expensive. The relief well has a very heavy mud that can "kill" the blow-out by reestablishing a borehole pressure greater than the formation pressure.

A second application for intercepting a first wells from a second well is to create a "U-shaped" well. Two horizontal wells are drilled from different locations and intercept "toe-to-toe" underground (see "First U-tube well connects horizontal wells", *Drilling Contractor*, September-October 2005). One purpose for drilling a U-shaped well is to lay cables or pipelines under a river. Another purpose is to provide a pipeline from land to an offshore well, where the stability of the seafloor cannot support a seafloor pipeline. Another purpose may be to produce heavy oil through hot subsurface formations, rather than through a seafloor pipeline exposed to cold water. Cold pipelines increase the viscosity of the heavy oil and may prevent its production. To drill a U-shaped well, a first well is drilled and cased. As the second well is drilled and approaches the end of the first well, a wireline tool must be inserted in the first well for magnetic ranging. This requires a rig be maintained on the first well to deploy the wireline tool in the horizontal well.

Therefore, it is a desire to provide an adjacent well locating device and method that addresses drawbacks of the prior art locating devices and methods. It is a still further desire to provide an adjacent well locating device and method with measurement while drilling ("MWD").

SUMMARY OF INVENTION

In one aspect, a method for locating a conductive target from a wellbore includes generating a current flowing across an insulated gap in a downhole tool positioned in the wellbore, measuring an azimuthal magnetic field with at least one external magnetometer located proximate the exterior of the downhole tool measuring a secondary magnetic field using an internal magnetometer disposed inside the downhole tool; and computing at least one of a direction and a distance to the conductive target.

In another aspect, a wellbore tool includes a tool body configured to move in a borehole, an electric current driving device having an insulated gap disposed on the tool body, wherein the electric current driving device is configured to generate an electric current across the insulated gap, and at least one external magnetometer disposed on an outer wall of the tool body.

In another aspect a method of measuring formation resistivity includes generating a current across an insulated gap in a downhole tool, measuring a voltage drop across the insulated gap, measuring an azimuthal magnetic field with an external magnetometer located proximate the exterior of the downhole tool, calculating a magnitude of a current flowing past the external magnetometer, determining an apparent resistivity of the formation based on the voltage drop and the current.

In another aspect, a method for determining the homogeneity of a formation includes generating a current flowing across in insulated gap in a downhole tool positioned in a wellbore, measuring an azimuthal magnetic field with at least one external magnetometer located proximate the exterior of the downhole tool, determining the current flowing past the external magnetometer from the measurement of the azimuthal magnetic field, and determining the formation homogeneity based on the ratio of the current flowing past the external magnetometer and the current flowing across the insulated gap and a ratio of the distance between the insulated gap and the external magnetometer and a distance between the insulated gap and a drill bit.

Other aspects and advantages of the invention will be apparent from the following description and the appended claims.

BRIEF DESCRIPTION OF DRAWINGS

FIG. 2A shows a cross-sectional view of an example of a sub of a bottomhole assembly.

FIG. 2B shows a cross-sectional view of the sub of FIG. 2A.

FIGS. 7A and 7B show an example of a bottomhole assembly and a casing and current distributions on the bottomhole assembly and casing.

FIGS. 7A and 7B show an example of a bottomhole assembly and a casing and current distributions on the bottomhole assembly and casing.

FIG. 14 shows an example method for determining the resistivity of a formation.

FIG. 15 shows an example method for determining the direction, orientation, and distance of a conductive target.

DETAILED DESCRIPTION

Figure 3:
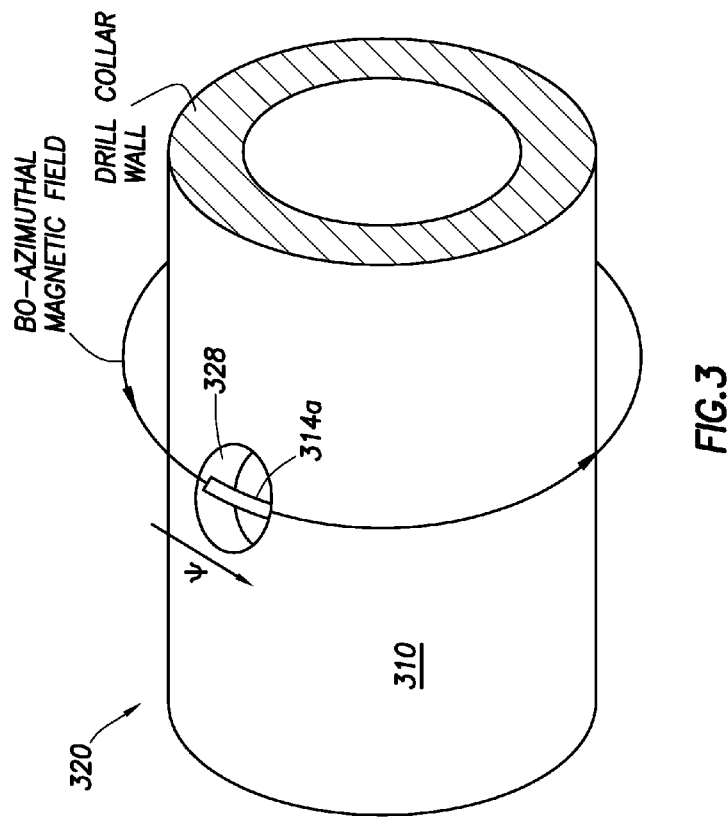
FIG. 3 shows a detailed view of an example of a sub of a bottomhole assembly.

In one aspect, embodiments of the invention relate to well drilling operations and more particularly to locating a casing or drill string of a first wellbore from a second wellbore while drilling the second wellbore. More specifically, embodiments disclosed herein relate to electric current and magnetic signals used in locating or detecting casing.

As used herein, the terms "up" and "down"; "upper" and "lower"; and other like terms indicating relative positions to a given point or element are utilized to more clearly describe some elements of the embodiments of the invention. Commonly, these terms relate to a reference point at the surface from which drilling operations are initiated as being the top point and the total depth of the well being the lowest point, whether or not the drilled well continues in a true downward direction. Like elements in the various figures may be denoted by like reference numerals for consistency.

Generally, embodiments disclosed herein relate to locating a cased well using a current source in the drill string bottom hole assembly (BHA), a three-axis magnetometer located inside a drill collar in the BHA, and single-axis magnetometers mounted on an outer wall or surface of the drill collar. As used herein, a drill collar may refer to a hollow tubular used as a component of a drillstring. The drill collar may be constructed of a non-magnetic metal such as stainless steel or beryllium copper; both of which are commonly used as drill collar material. The wall thickness of drill collar is typically an inch or greater.

A current source may be provided by an electric current driving device. For example, the current source may be provided by an E-Pulse™ or E-Pulse Express tool, commercially available from Schlumberger (Houston, Tex.), which has an insulated gap between two sections of drill collars. For purposes of brevity, a current driving device may be referred to herein as "E-pulse," although other current driving devices may be utilized without departing from the scope of embodiments disclosed herein. Thus, "current driving device" and "E-pulse" may be used interchangeably herein. A distance and bearing to the cased well may be determined by measuring a secondary magnetic field that corresponds to induced currents on the cased well. This patent application builds on concepts described in copending patent applications U.S. application No. 60/733,347, filed on November, 2005; Ser. No. 11/550,839, filed on Oct. 19, 2006; and U.S. application No. 60/822,598, filed on Aug. 16, 2006. Each of these applications is assigned to the assignee of the present application, and they are hereby incorporated by reference in their entirety.

Figure 1:
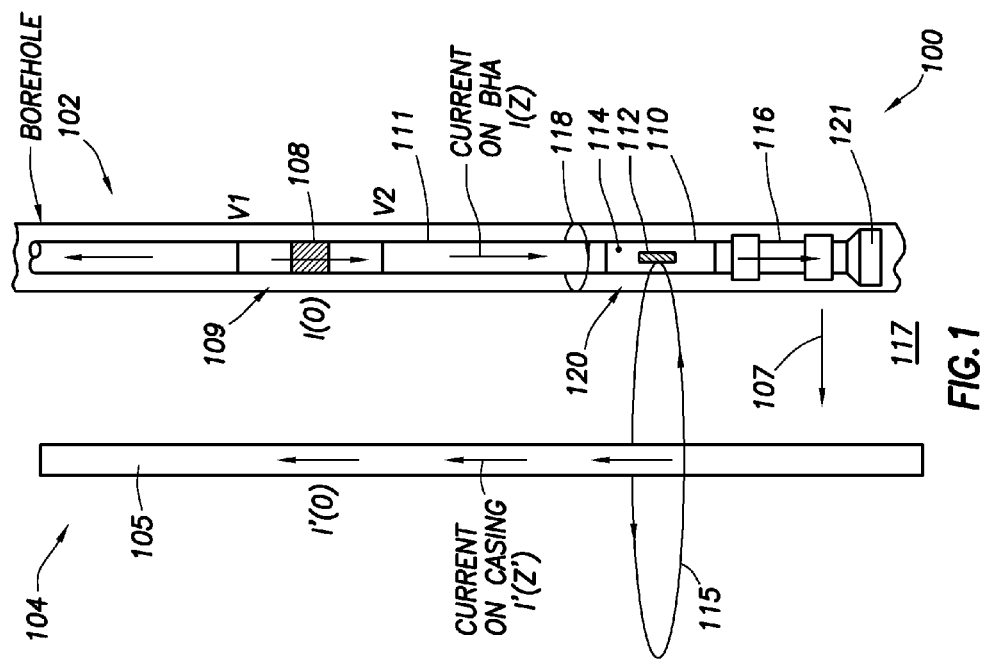
FIG. 1 shows one example of a bottomhole assembly near a cased well.

FIG. 1 shows a general configuration of a wellbore locating system 100 for locating casing while drilling in accordance with examples disclosed herein. Wellbore locating system 100 includes a bottom hole assembly ("BHA") 102 that is equipped to locate a target wellbore or target well 104 in earthen formation 117 while the BHA 102 is used to drill a second wellbore in formation 117, such that the second wellbore may be positioned as desired and guided along a desired trajectory with respect to the target well 104. Target well 104 has been completed with target casing 105.

As shown, drilling BHA 102 is disposed adjacent to target well 104. The BHA 102 may include a drill bit 121 and a steerable system 116. Additionally, the drilling BHA 102 may include an electric current driving device 109, which is used to generate an axial current on the BHA 102 by applying a voltage difference ($V_1-V_2$) across the insulated gap 108. In one embodiment, an E-Pulse MWD tool may be used to generate an axial current on the BHA 102. However, one of ordinary skill in the art will appreciate that an electric current may be generated by any means known in the art, such that the tool includes an insulated gap and current generating means. For example, the current driving device may be an electromagnetic telemetry tool or BHA 102 may include a mud pulse telemetry tool and a current driving device.

The current of the BHA 102 is denoted as I(z), where z is the distance along the BHA 102 and where z=0 corresponds to the insulated gap 108 in the E-Pulse 109. The current I(0) across the insulated gap 108 of the E-Pulse 109 may be measured and transmitted to the surface. Located below the E-Pulse 109 is a drill collar 110 that contains an internal, three-axis magnetometer 112 and at least one single-axis magnetometer 114 mounted on an outer wall or surface of the drill collar 110. Although single-axis magnetometers are sufficient, two-axis or three-axis magnetometers may also be used without departing from the scope of the present disclosure. In this description, "single magnetometer" may be used to refer to these sensors. The term "magnetometer" is used to mean any device that can measure the intensity of a magnetic field. One example of a magnetometer is a fluxgate magnetometer. One of ordinary skill in the art will also appreciate that additional drill collars 110 may be coupled to the BHA 102.

In one example, at least one drill collar 111 may be positioned between the three-axis magnetometer 112 and the current driving device. In another example, the three-axis magnetometer may be in the same drill collar as the current driving device. The location of a bottom of the drill is denoted as z=L. Further, BHA 102 may also include logging-while-drilling (LWD) tools, measurement-while-drilling (MWD) tools, telemetry tools, as well as other downhole tools for use in a drilling environment. Note that the current driving device 109 is shown to be disposed above the three-axis magnetometer 112 (and the single-axis magnetometer 114); however, the order of their arrangement is not critical.

Still referring to FIG. 1, current driving device 109 generates an electric current I(0) across insulated gap 108. In one embodiment, electric current I(0) may have a frequency between about 1 Hz and about 100 Hz and an amplitude up to about 17 amps. For convenience, all voltages, currents, and magnetic fields may be represented as having a sinusoidal time dependence of the form, I(z,t)=I(z)·sin(2π ft), where t is time and f is frequency. Subsequently, the time dependence will be suppressed from the equations, but is understood. Current I(z) flows along BHA 102 and enters formation 117, shown as current 107. In oil-based mud (OBM), most of current I(z) will leave through drill bit 121 and will return to BHA 102 above insulated gap 30 through stabilizers (not shown) and drill pipe (not shown) in contact with the wall of wellbore (not shown). In water-based mud (WBM), current I(z) will flow out of BHA 102 along its length. Current I(z) decreases in an approximately linear manner between insulated gap 108 and drill bit 121 in WBM. When casing 105 is adjacent to BHA 102, some of current I(z) will concentrate on casing 105, shown as current I'(z'), and return to the upper portion of BHA 102, after traveling along casing 105. The axial distance along the cased well is denoted as z'.

Target casing 105 provides a very low resistance path compared to formation 117, because the conductivity of casing is typically six orders of magnitude greater than formation conductivity. For example, the resistance of 9⅝ inch casing is roughly equivalent to a cylinder of 1 ohm-m formation with a diameter of 500 feet. This high contrast results in much more current returning on the casing than in the formation when casing 105 is near BHA 102.

Figure 4:
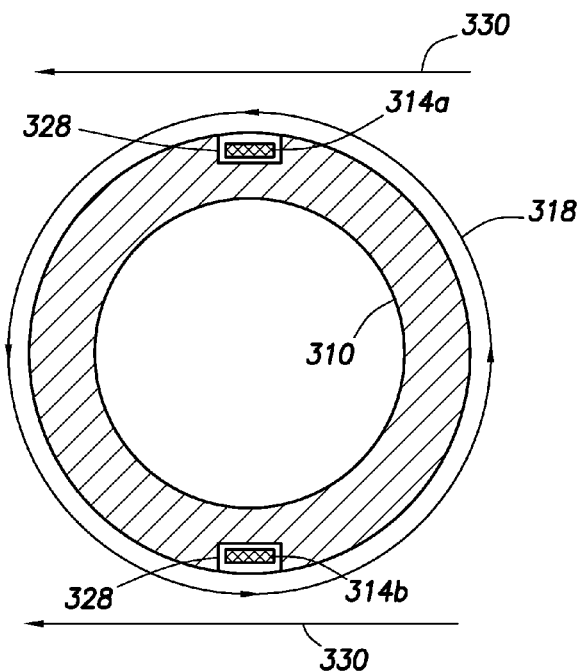
FIG. 4 shows a cross-sectional view of an example of a sub of a bottomhole.

The current I(z) flowing on the drill collar 110 will induce an azimuthal magnetic field 118 around the drill collar 110. The azimuthal magnetic field 118 outside the drill collar 110 of the BHA is given by:

$$\vec{B}_0(\rho) = \frac{\mu_0 I(z)}{2\pi\rho}\vec{\psi} \quad (1)$$

where $\mu_0=4\pi\cdot10^{-7}$ Henry/m (permeability of free space), $\rho$ is the radial distance in meters from the axis of the BHA 102, and $\vec{\psi}$ is a unit vector in the azimuthal direction around the BHA 102 (see FIGS. 1, 3 and 4). Magnetic field 118 does not penetrate inside a sub containing the three-axis magnetometer 112 if the sub's drill collar 110 has azimuthal symmetry and is properly designed. Therefore, in some cases, the three-axis magnetometer 112 cannot detect the azimuthal magnetic field $\vec{B}_0$. However, the three-axis magnetometer 112 may detect a secondary magnetic field $\vec{B}_1$ arising from the current I'(z') on the target casing 105.

Electric current I'(z') on casing 105 produces magnetic field $\vec{B}_1$, which is an azimuthal magnetic field 115 centered on target casing 105. The presence of magnetic field $\vec{B}_1$ 115 indicates that target casing 105 is nearby, and the intensity and orientation of magnetic field $\vec{B}_1$ can be used to estimate the distance and direction from BHA 102 to target casing 105 and thus cased well 104.

Current I'(z') on target casing 105 will be weaker than current I(z) on BHA 102, but will have the same frequency and be in phase. With current I'(z') on casing 105, azimuthal magnetic field $\vec{B}_1$ centered on target casing 105, as measured by the three-axis magnetometer 112 in the BHA 102, is given approximately by Eq. 2:

$$\vec{B}_1(z) = \alpha \frac{\mu_0 I'(z')}{2\pi r}\vec{\psi} \quad (2)$$

where $\mu_0=4\pi\cdot10^{-7}$ Henry/m, r is the radial distance (meters) from target casing 105 at axial location z to BHA 102, where $\vec{\psi}$ is the unit vector in the azimuthal direction with respect to the casing 105, and where $\alpha$ is a constant that describes the attenuation of magnetic field $\vec{B}_1$ inside drill collar 110. The value chosen for z' for a given value of z depends on the geometry of the casing and the BHA as described in copending patent applications 60/733,347, filed on Nov. 4, 2005; application Ser. No. 11/550,839, now U.S. Pat. No. 7,812,610, filed on Oct. 19, 2006, and published on Jun. 7, 2007 as publication no. 2007-0126426; and 60/822,598, filed on Aug. 16, 2006. Measuring magnetic field $\vec{B}_1$ 115 provides information about the direction and distance of target casing 105 relative to BHA 102.

Magnetic field $\vec{B}_1$ 15 from target casing 105 will penetrate drill collar 110 and pressure housing (222 in FIG. 2) provided the frequency is sufficiently low, but will be attenuated by the factor $\alpha$ due to the skin effect. The skin depth ($\delta$) in a metal with conductivity $\sigma$ and magnetic permeability $\mu'$ is given by Equation 3, where f is the frequency.

$$\delta = (\pi f \mu' \mu_0 \sigma)^{-1/2} \quad (3)$$

where $\mu_0$ is the permeability of free space, and $\sigma$ is the conductivity of the metal. For example, non-magnetic steel ($\mu'=1$) used in drill collars typically has a conductivity $\sigma\sim1.4\times10^6$ S/m. At 10 Hz, the skin depth is 5.3 inches (0.13 m), so magnetic field $\vec{B}_1$ can reach three-axis internal magnetometer 112 for frequencies of 10 Hz and lower with very little attenuation for a drill collar with a 1-inch wall thickness. Hence, for a given frequency, $\alpha$ will be a constant whose value is slightly less than 1. The value for $\alpha$ can be easily determined theoretically or experimentally.

Magnetic field $\vec{B}_1$ will be perpendicular to a radius from target casing 105 to the point of observation, i.e., three-axis internal magnetometer 112. Thus, by analyzing magnetic field $\vec{B}_1$ three-axis magnetometer 112 can be used to determine a direction that either points toward or away from target casing 105. Provided that the distance to target casing 105 is less than a skin depth in formation 117, magnetic field $\vec{B}_1$ will be in phase with the source current I(z). Hence, the direction toward the casing 105 can be determined. This condition may be met where, for example, the skin depth in a 1 ohm-m formation is 5200 feet (1.6 km) at 10 Hz.

FIGS. 2A and 2B show detailed views of a sub 220 having a plurality of magnetometers (212, 214). Sub 220 has an internal pressure housing 222 that contains an internal magnetometer 212. Examples of an internal magnetometer 212 include one, two, and three-axis magnetometers. Internal pressure housing 222 may further contain electronics, a processor, memory, a power supply, and telemetry functions, generally indicated at 224. In one example, the power supply may include batteries. An annular space 226 is formed between the pressure housing 222 and an inside wall of the drill collar 210 to allow mud flow through sub 220. The pressure housing 222 may be held centered in the drill collar 210 using centralizers (not shown). Furthermore, pressure housing 222 may be electrically insulated from the drill collar so that none of the current I(z) can flow on it. This can be accomplished using plastic or rubber in the centralizers The telemetry function may be used to transmit data to the surface, either directly via mud pulse or electromagnetic telemetry, or to transmit the data to another MWD tool that transmits the information to the surface. For example, to transmit the data to another MWD tool that transmits the information to the surface, the telemetry may include a short-hop system using wired or wireless methods known in the art. In one example, sub 220 may include at least one external magnetometer 214. In one example, the external magnetometer 214 is a single-axis magnetometer. A recess, or shallow pocket, 228 may be formed in an outer wall of the drill collar 210 and configured to receive and house the at least one external magnetometer 214. As shown, in one example, two external magnetometers 214 may be mounted in recesses 228 formed in the outer wall of the drill collar 210.

Referring now to FIG. 3, a detailed view of a sub 320 having an external single-axis magnetometer 314a is shown. In the example shown, the external single-axis magnetometer 314a is disposed in a recess or pocket 328 formed on the outside wall of drill collar 310 and is aligned with the azimuthal direction $\vec{\psi}$ with respect to the drill collar axis. A second magnetometer 314b is disposed opposite the first magnetometer in a recess or pocket 328, as shown in FIG. 4. The second magnetometer 314b is also aligned in the azimuthal direction $\vec{\psi}$. In one example, magnetometers 314a and 314b may be enclosed in non-magnetic pressure vessels (not independently illustrated).

Each magnetometer 314a, 314b produces a signal $S_i$ proportional to a magnetic field B, i.e. $S_1 = \alpha_1 \cdot B$ and $S_2 = \alpha_2 \cdot B$, where $\alpha_1$ and $\alpha_2$ are sensitivity factors for each magnetometer. Referring again to FIG. 4, if a uniform, transverse magnetic field $\vec{B_e}$ (330), e.g., the Earth's magnetic field, and an azimuthal magnetic field $\vec{B_0}$, indicated at 318, are both present, then the signal in the first magnetometer 314a is $S_1 = \alpha_1 (B_e \cos \psi + B_0)$, where $\psi$ is the angle between the magnetometer's axis and the transverse magnetic field $\vec{B_e}$, indicated at 330. The signal in the second magnetometer 314b is $S_2 = \alpha_2 (-B_e \cos \psi + B_0)$.

The relationship between the difference of the two magnetometer signals, $S_1$, $S_2$, and the transverse field $\vec{B_e}$ may be characterized by $$B_e \cos \psi = \frac{1}{2}\left(\frac{S_1}{\alpha_1} - \frac{S_2}{\alpha_2}\right).$$

Thus, this relationship may be used to determine the orientation of the drill collar 310 with respect to the Earth's magnetic field.

The relationship between the sum of the two signals, $S_1$ and $S_2$ and the azimuthal magnetic field $\vec{B_0}$ surrounding the drill collar 310 may be characterized by $$B_0 = \frac{1}{2}\left(\frac{S_1}{\alpha_1} + \frac{S_2}{\alpha_2}\right).$$

Two calibrated external magnetometers may, therefore, be used to determine the azimuthal magnetic field $\vec{B_0} = B_0 \vec{\psi}$. Consequently, the axial current I(z) at the location of the external magnetometers 314a b may be determined, for example, using Equation 1, where $\rho$ is the radial distance of the external magnetometer from the z axis, and where z is the position of the external magnetometer.

If only one external magnetometer (i.e., 314a or 314b) is present, it will measure a combination of the Earth's magnetic field $\vec{B_e}$, and an azimuthal magnetic field $\vec{B_0}(t)$, $S(t) = \alpha(B_e \cos \psi(t) + B_0(t))$, where the angle $\psi(t)$ and the azimuthal magnetic field $\vec{B_0}(t)$ are functions of time. If the drill collar is stationary and not rotating, then the signal is $S(t) = \alpha(B_e \cos \psi + B_0(t))$, so the DC signal $\alpha B_e \cos \psi$ can be removed to leave the AC signal $\alpha B_0(t)$. Hence $\vec{B_0}(t)$ can be determined. If the drill collar RPM $\partial \psi(t)/\partial t$ is known and sufficiently different in frequency from $\vec{B_0}(t)$, then a frequency analysis of S(t) can be performed to determine $\vec{B_0}(t)$.

Referring back to FIG. 1, measuring the external current at a location near the internal magnetometer 112 may provide multiple advantages. Firstly, a knowledge of axial current I(z) may be used to improve an estimate of a current on a casing opposite the magnetometer sub 120, thus enhancing the accuracy of a measurement of a distance between the BHA 102 and the casing 105. Secondly, the current on the BHA 102 at the magnetometer sub 120 may be used to estimate a formation resistivity when combined with a measurement of the voltage across the insulated gap 108 of E-Pulse. At a minimum, comparing the current measured by the external magnetometers 114 to the current measured at the insulated gap 108 may be used to determine if the formation is homogeneous or heterogeneous. Thirdly, the external magnetometers 114 provide a reference signal that may be used for lock-in detection and noise suppression. Lock-in detection generally relates to a technique used to recover a signal, even in the presence of broadband noise, whose magnitude is greater than the signal itself If the magnetic field $\vec{B_1}$, indicated at 115, from the cased well 104 is relatively weak, then a reference signal from the external magnetometers 114 may be used to increase a signal-to-noise ratio using lock-in detection. These three applications will be explained in more detail below.

In one example, a signal from each of two external magnetometers 214 (also shown as 314a, 314b in FIG. 4) may be digitized, and the sum and differences of the two external magnetometer signals may be computed by the processor, generally indicated at 224, in FIG. 2. Digitization of the signal and subsequent calculation of the sum and differences of the two external magnetometers 214 may allow for calibration and gain factors to be used for the individual external magnetometers 214. Alternatively, analog outputs of the two external magnetometers 214 may be used in sum and difference circuits.

Referring to FIGS. 1 and 5, the axial current I(z) on the BHA 102 enters the formation along the length of the BHA 102 when conductive drilling mud is used in well 102. For example, water-based mud is typically conductive. In a homogenous formation, the current is maximum at the insulated gap 108 and decreases in a nearly linear manner towards the drill bit 121, where it is approximately zero, i.e., $I(z) \approx I(0)(1-z/L)$ and $I(L) \approx 0$. A significant fraction of the current entering the formation, indicated by arrow 134, concentrates and returns on the target casing 105. The return current along the target casing 105, or casing current, is denoted as $I'(z')$ where z' is the distance along the casing 105. For nearly parallel wells, z'=0 is taken to be opposite z=0.

Figure 5A:
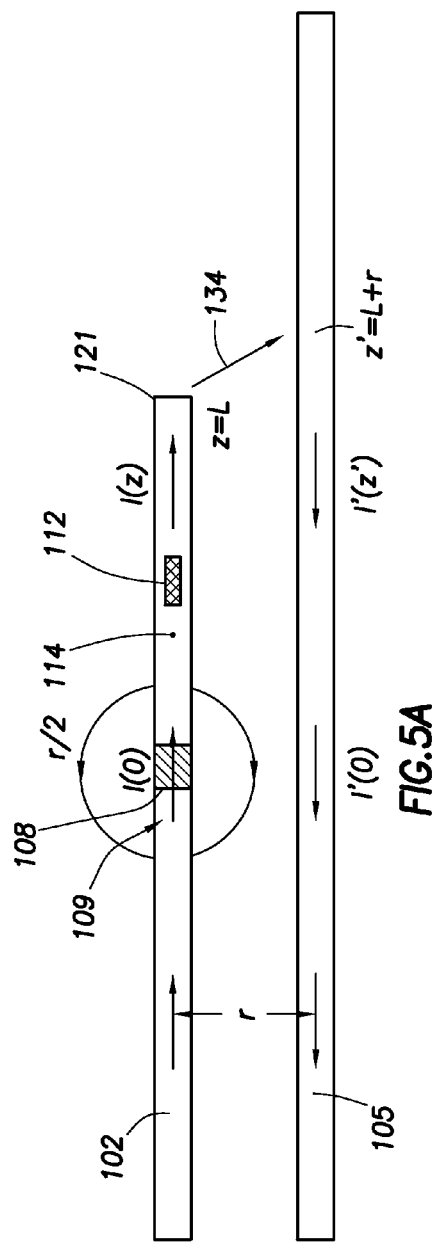
FIGS. 5A and 5B show an example of a bottomhole assembly and a casing and current distributions on the bottomhole assembly and casing.
Figure 5B:
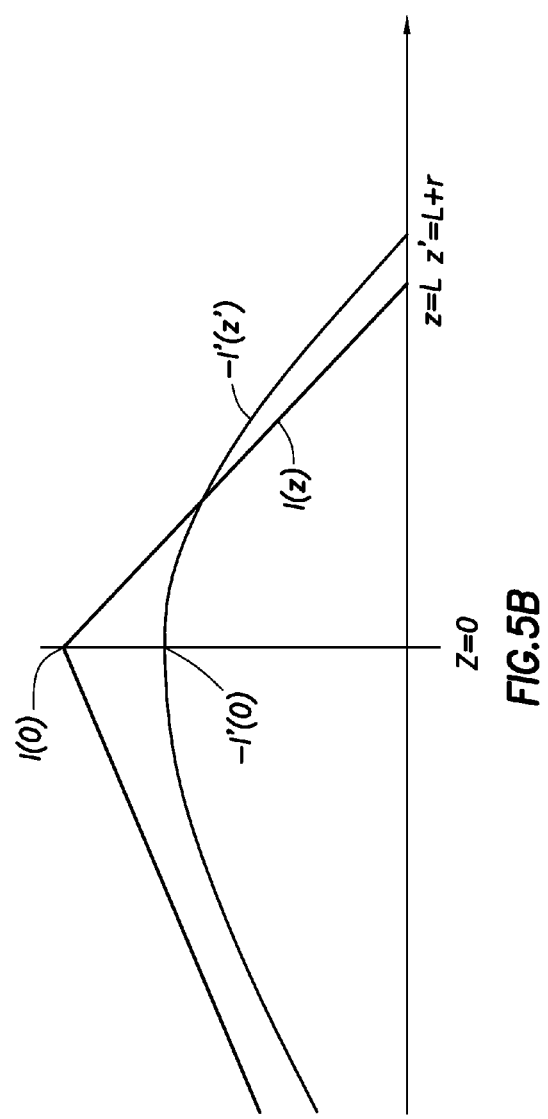

In the embodiment shown in FIGS. 5A and 5B, the current distribution $I'(z')$ on the target casing 105 is related to the current distribution on the BHA 102, but with the following differences. First, the return current $I'(z')$ flows in the opposite direction of the axial current I(z). However, because the operating frequency may be a few hundred Hertz or lower, the phase of the return current is exactly 180° with respect to the axial current I(z). Second, fringing currents from the drill bit 121 cause the current on the casing 105 to extend slightly beyond z'=L. In this example, the current on the casing ends at approximately $z' \approx L+r$, i.e., $I'(L+r) \approx 0$. Here, r is the distance from the three-axis internal magnetometer 112 in the BHA 102 to casing 105. Third, the current along the casing 105 will vary in a sinusoidal manner, which can be approximated by the term:

$$\cos\left(\frac{\pi z'}{2(L+r)}\right)$$

for $z' \geq 0$.

Fourth, not all of the current emitted from the BHA 102 will reach the cased well 105. Current emitted near the insulated gap 108 within a distance $z=\pm r/2$ of the insulated gap 108 will not reach the casing 105. As shown in FIG. 5B, return current $I'(z')$ is flat around z'=0, because return current flows through the formation without entering the casing 105. Hence the return current $I'(z')$ may be reduced by a factor $$\left(1 - \frac{r}{2L}\right)$$

to account for the current in the formation which does not reach casing 105. In addition, not all of the current emitted beyond $z=\pm r/2$ will return through the cased well 105. The current on the casing $I'(z')$ is further reduced by a scale factor κ that is less than 1 but generally larger than 0.1. The factor κ may be determined by modeling or by performing experiments in a test tank.

Figure 6:
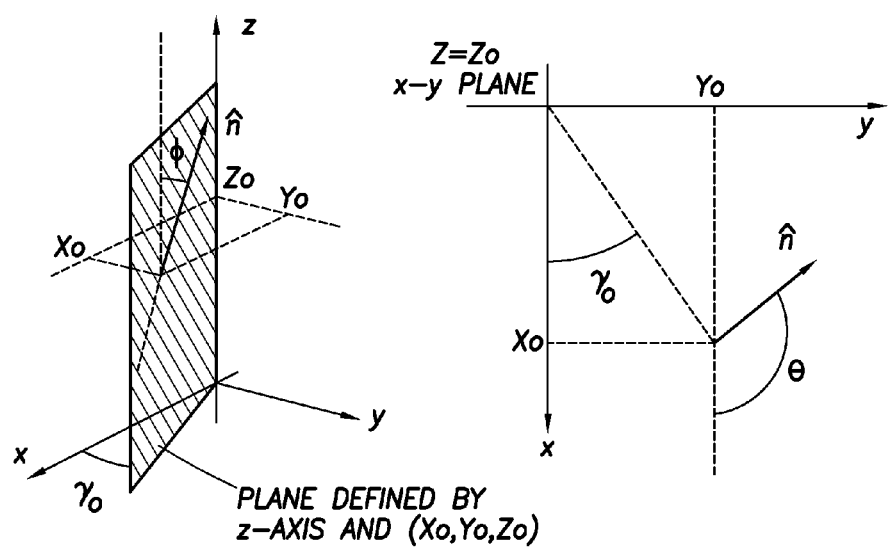
FIG. 6 shows a geometry of an example bottomhole assembly and cased well.

A fifth difference between the current distribution $I'(z')$ on the casing 105 and the current distribution on the BHA 102 depends on the relative orientation between the BHA 102 and the cased well 104. FIG. 6 illustrates a geometry describing two wells in accordance with embodiments disclosed herein. The BHA lies in the $\hat{z}$ direction; the cased well is in the $\hat{n} = n_x\hat{x} + n_y\hat{y} + n_z\hat{z}$ direction; and three-axis internal magnetometer 112 is located at (x, y, z)=(0, 0, $z_0$). In FIG. 6, φ is the angle between $\hat{z}$ and $\hat{n}$, i.e. $\hat{z} \cdot \hat{n} = \cos \phi$; θ is the angle between the projection of $\hat{n}$ into the x-y plane and $\hat{x}$, i.e. $\hat{x} \cdot (n_x\hat{x} + n_y\hat{y}) = n_x = \cos \theta$. The conductive target intersects the x-y plane defined by $z=z_0$ at the location ($x_0$, $y_0$, $z_0$), and $\gamma_0$ is defined by $$\tan \gamma_0 = \frac{y_0}{x_0}.$$

The maximum current on the casing 105 will occur when the BHA 102 is parallel to the cased well, i.e. when φ=0. A minimum amount of current will flow on the casing 105 when the BHA 102 is perpendicular to the cased well 104, i.e. when φ=π/2. Additional details relating to the mathematics may be found in U.S. application Ser. No. 11/550,839, previously incorporated herein by reference.

The return current $I'(z')$ on the casing may be represented as:

$$I'(z') \approx -\kappa \cdot I(0) \left(1 - \frac{r}{2L}\right) \cdot \sqrt{\cos^2\phi + \sin^2\phi \cdot \cos^2(\theta - \gamma_0)} \cdot \cos\left(\frac{\pi z'}{2(L+r)}\right) \quad (4)$$

for z'>0. For the special case of nearly parallel wells, such as with SAGD wells, the small angle approximation φ<<1 can be made so that $$I'(z') \approx -\kappa \cdot I(0) \left(1 - \frac{r}{2L}\right) \cdot \cos\left(\frac{\pi z'}{2(L+r)}\right) \quad (5)$$

for z'>0. Under this condition, it may also be approximated that z'≈z. The formation resistivity does not contribute to these estimates for the casing current $I'(z')$, provided that the formation resistivity is relatively homogeneous.

Referring generally to FIG. 1, the casing current $I'(z')$ generates a magnetic field $\vec{B}_1$ 115 at the location of the three-axis magnetometer 112, which is given by the approximate formula:

$$\vec{B}_1(z) = \alpha \frac{\mu_0 I'(z')}{2\pi r^2} \hat{n} \times (-\vec{r}) \quad (6)$$

where α and $\mu_0$ have the same definitions as given for equations 1 and 2; $\vec{n}$ is a unit vector in the direction of the target casing; $\vec{r}$ is a vector between the internal magnetometer and the target casing, $I'(z')$ is the current flowing on the target casing; and r is the magnitude of the $\vec{r}$ vector. It may be assumed that the magnetic field $\vec{B}_1$, from the casing 105 is approximated by the formula for an infinite line current in Equation 6. That is, Equation 6 is rigorously true only if the current $I'(z')$ is a constant with respect to z'. However, applicant has determined that this expression is a useful approximation when $I'(z')$ varies in accordance with Equations 4 or 5. In this case, the current $I'(z')$ is evaluated at the particular location z' which is the closest point on the cased well 104 to the internal magnetometer 112. The value for z' may be obtained by demanding that the vector $\vec{r}$ which points from the internal magnetometer 112 to the cased well 104 be perpendicular to both $\hat{z}$ and $\hat{n}=\hat{z}'$. Other expressions may be derived that include the effect of the variation of the current $I'(z')$ with z' on the magnetic field. For example, the magnetic field $\vec{B}_1$ may be calculated using the well known Biot-Savart law with a varying current $I'(z')$.

To determine the distance from the BHA 102 to the target casing 105, the magnitude of the induced magnetic field $\vec{B}_1$ at the internal magnetometer 112 may be determined, as it relates to the inverse of Equation 6, with an assumed value for the return current I'(z'). This procedure is described in detail in U.S. patent application No. 60/733,347, filed on Nov. 4, 2005; Ser. No. 11/550,839, now U.S. Pat. No. 7,812,610, filed on Oct. 19, 2006; and 60/822,598, filed on Aug. 16, 2006, all of which have been incorporated by reference herein. If the formation is homogeneous, then Equation 4 or Equation 5 may be used to estimate I'(z'), as appropriate for the well's alignment. The current at the insulated gap 108, I(0), may be measured by the E-Pulse and substituted into Equation 4 or 5.

However, if the formation is heterogeneous, then the current distribution on the BHA 102 may be different than that indicated in FIG. 5B. Referring now to FIGS. 7A and 7B, if the drill bit 721 is in a relatively conductive bed 738, but the E-Pulse and magnetometers 712 are in a relatively resistive bed 740, then the axial current I(z) will be stronger at the magnetometers 712 than in a homogenous formation. Referring now to FIGS. 8A and 8B, if the drill bit 821 is in a relatively resistive bed 840, but the E-Pulse and magnetometers 812 are in a relatively conductive bed 838, then the axial current I(z) will be weaker at the magnetometers 812 than for a homogenous formation. In these two examples, Equations 4 and 5 may not provide the best estimate for the current on the casing 705, 805.

Referring generally to FIG. 1, if the external magnetometer 114 is located at $z=z_0$, the current $I(z_0)$ may be determined from Equation 1 where $\rho$ is the radial distance from the z axis to the external magnetometer. When the ratio of the current at the magnetometer 114 to the current at the insulated gap 108 is given by:

$$\frac{I(z_0)}{I(0)} = 1 - \frac{z_0}{L}, \tag{7}$$

it may be understood that the formation is sufficiently homogenous to apply Equation 4 or 5. However, when $$\frac{I(z_0)}{I(0)} \neq 1 - \frac{z_0}{L},$$

then the formation is said to be heterogeneous, and a different equation for I'(z') is needed. If, for example, the ratio of the current at the magnetometer 114 to the current at the insulated gap 108 is greater than predicted by equation 7, that is:

$$\frac{I(z_0)}{I(0)} > 1 - \frac{z_0}{L}, \tag{8}$$

then a situation such as illustrated in FIGS. 7A and 7B holds. Alternatively, if the ratio of the current at the magnetometer 114 to the current at the insulated gap 108 is less than predicted by equation 7, that is:

$$\frac{I(z_0)}{I(0)} < 1 - \frac{z_0}{L}, \tag{9}$$

then the situation illustrated in FIGS. 8A and 8B holds. Equations 7, 8, and 9 are meant to illustrate the general principle of how to determine whether the formation is homogeneous or heterogeneous. A more general approach is to develop a full theoretical model for the current distribution on the BHA for a homogeneous formation, i.e. $I(z)=I(0)\cdot f(z, L)$. As noted above, the approximate formula is $$f(z, L) \approx 1 - \frac{z_0}{L}.$$

A homogeneous formation is indicated by ratio of the current at the magnetometer 114 to the current at the insulated gap 108 given by $$\frac{I(z_0)}{I(0)} = f(z_0, L), \tag{7a}$$

while a situation such as illustrated in FIGS. 7A and 7B is indicated by $$\frac{I(z_0)}{I(0)} > f(z_0, L), \tag{8a}$$

and a situation such as illustrated in FIGS. 8A and 8B is indicated by $$\frac{I(z_0)}{I(0)} < f(z_0, L). \tag{9a}$$

In one example, it may be approximated that $$I'(z_0) = -\kappa \cdot I(z_0), \tag{10}$$

i.e., the magnitude of the current returning on the casing is proportional to the current on the BHA, where $\kappa$ is a constant determined by computer modeling or by measurements in a test tank. The value of $\kappa$ is less than 1 and typically greater than 0.1. This expression for I'($z_0$) may be reasonably assumed when the casing and BHA are nearly parallel and when $z_0$ is somewhat greater than r. That is, the external magnetometer 114 is further from the gap 108 than the casing 105 is from the BHA 102. Alternatively, a database may be created using a numerical model that describes the situations shown in FIGS. 5, 7 and 8 for various values for the resistivities of formations, for example, of beds (740, 840) and beds (738, 838), for various inter-well spacings, and for the specific BHA. The database may include appropriate values for I'(z') corresponding to the measured ratio I($z_0$)/I(0). In certain embodiments, the database may be prepared in advance of the drilling of the well and stored on a wellsite computer.

In the described examples, the location of the at least one external magnetometer and the location of the internal magnetometer are both taken to be at the same axial location, i.e. $z=z_0$. This is not a required condition; they may be placed at different distances from the insulated gap. Those skilled in the art will realize that the internal and external magnetometers may be placed at different distances from the insulated gap, and a theoretical model used to correct for the different positions.

Referring again to FIG. 1, in one example, the E-Pulse can provide a basic resistivity R measurement from the ratio of the voltage drop ($V_1-V_2$) across the insulated gap 108 and the current I(0) at the insulated gap 108 as illustrated by R=K ($V_1-V_2$)/I(0), where K is a constant that only depends on the geometry of the BHA 102. The axial resolution of this measurement is approximately equal to L, the distance between the insulated gap 108 of E-Pulse and the drill bit 121. A higher resolution resistivity R' measurement may be obtained from the current determined from external magnetometers 114, as calculated by:

$$R'=K(V_1-V_2)/I(z_0), \qquad (11)$$

where K' is a different constant. The current measurement derived from external magnetometers 114 includes only the current leaving the BHA 102 between the external magnetometers 114 and the drill bit 121. Thus, all of the drill collars (not independently illustrated) below the external magnetometers 114 form an effective electrode. The axial resolution for R' is approximately equal to the distance from the external magnetometers 114 to the drill bit 121, namely (L−$z_0$). In addition, R' will have a smaller borehole effect than R, because the drill collars between the insulated gap and the external magnetometers 114, e.g., drill collar 111, will help focus the current into the formation.

Figure 9:
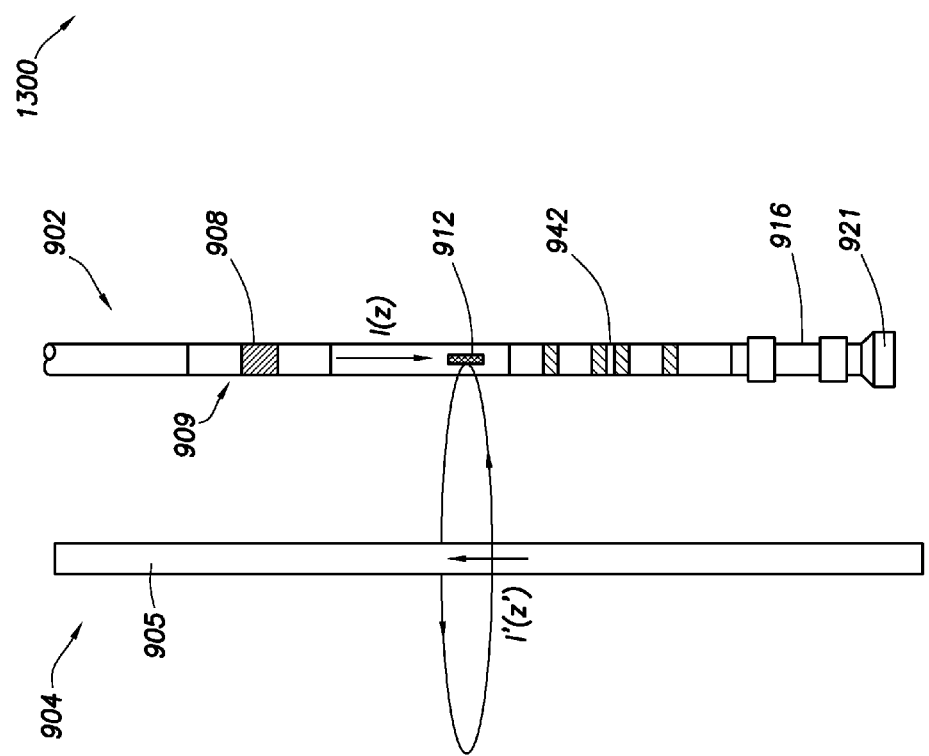
FIG. 9 shows an example bottomhole assembly with resistivity measurement.

FIG. 9 shows an example BHA 902 that includes a dedicated resistivity measurement device 942. The resistivity measurement device 942 may include a propagation measurement device (e.g., a MCR, an ARC, or a PeriScope®, all commercially available from Schlumberger (Houston, Tex.)). Alternatively, the resistivity measurement device 942 may include an electrode measurement device (e.g., Resistivity-at-the-Bit (RAB®) from Schlumberger Technology Corp.). In certain examples, these tools may be run below the E-Pulse tool.

Figure 10A:
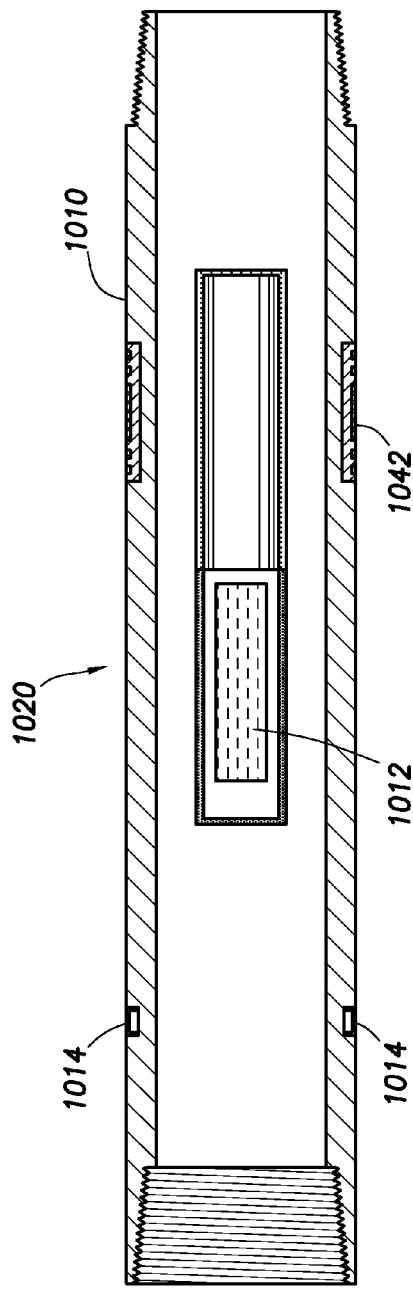
FIGS. 10A and 10B show an example of a sub of a bottomhole assembly.
Figure 10B:
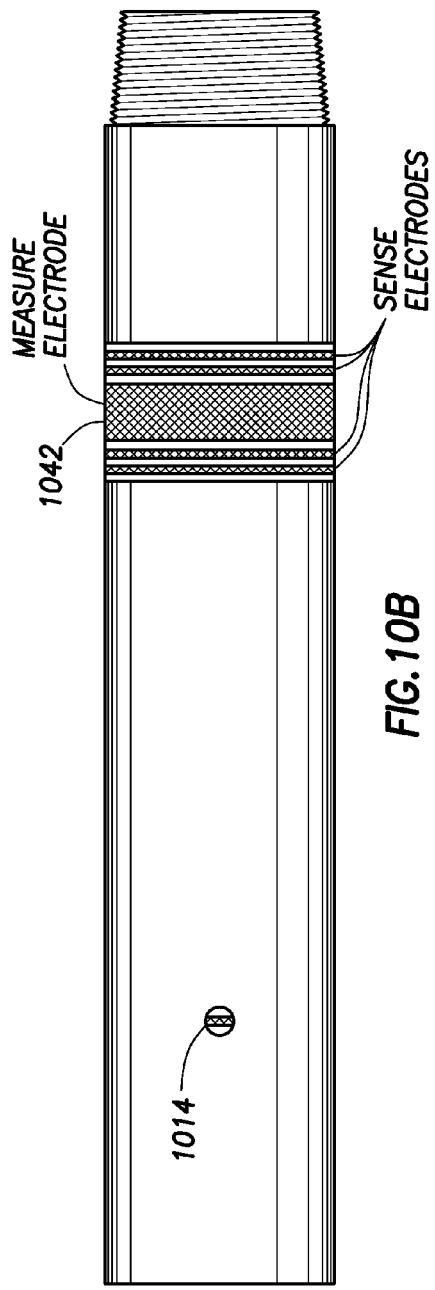

Referring now to FIGS. 10A and 10B, an electrode resistivity measurement device 1042 may be disposed in a sub 1020. In this example, sub 1020 includes an internal magnetometer 1012 located inside a drill collar 1010 in the BHA (not independently illustrated) and external magnetometers 1014 mounted on an outer wall of the drill collar 1010. In one example, the internal magnetometer 1012 is a three-axis magnetometer and the external magnetometer 1014 is a single-axis magnetometer. Combination of the electrode resistivity measurement device 1042 with sub 1020 may minimize capital investment in the BHA and may minimize additional lengths of the BHA below the E-Pulse tool. For example, such a resistivity measurement can be achieved with the focused electrode principle described in U.S. patent application Ser. No. 11/617,216 now U.S. Pat. No. 7,782,060, filed on Dec. 28, 2006, and assigned to the assignee of the present application. That application is hereby incorporated by reference in its entirety.

Figure 11:
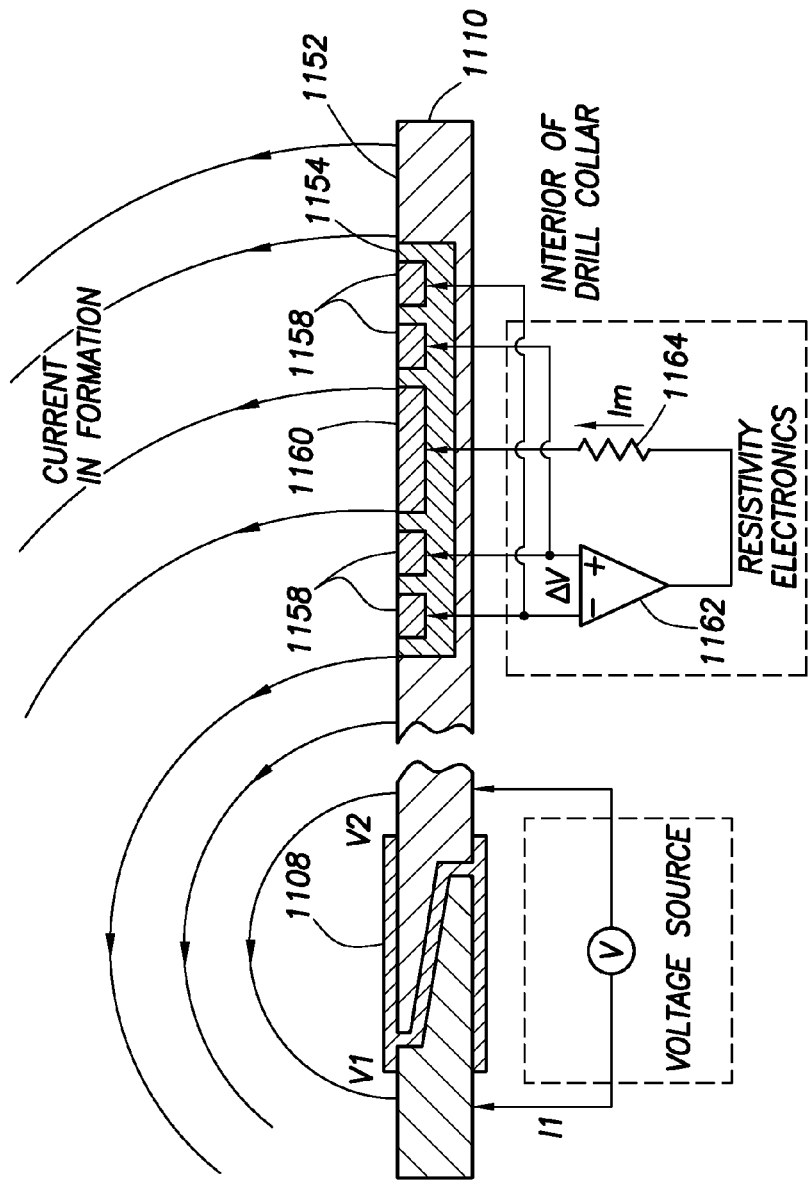
FIG. 11 is a schematic diagram of example electrodes and resistivity electronics for a bottomhole assembly.

A schematic diagram of the electrodes and resistivity electronics in accordance with examples disclosed herein is shown in FIG. 11. The E-Pulse provides a voltage difference across the insulated gap 1108 which also serves as the resistivity measurement. An insulating material 1154 may be added to the outside 1152 of the drill collar 1110 containing the magnetometers (not shown) and several metal electrodes 1158 and 1160 are integrated into the insulating material 1154. In the embodiment shown, there are five metal electrodes. Four outer (sense) electrodes 1158 surround a central (measure) electrode 1160. The formation resistivity $R_A$ is obtained from the equation $R_A=K_A(V_1-V_2)/I_m$, where ($V_1-V_2$) is the voltage across the insulated gap 1108 of E-Pulse, where $I_m$ is the current emitted from the center (measure) electrode 1160, and where $K_A$ is a geometric constant that depends on the BHA and electrodes' geometry. The four outer (sense) electrodes 1158 monitor the voltages in the borehole, and are used to focus the measurement current. To prevent current from simply flowing up the borehole, the voltage drop between pairs of sense electrodes 1158 is monitored and a high gain operational amplifier 1162 is connected to the circuit. The operational amplifier 1162 drives the measure electrode current $I_m$, which passes through a calibrated resistor 1164. The circuit shown drives the voltage drop between the sense electrodes 1158 to zero. Thus, no current may flow along the borehole.

Once the formation resistivity has been measured, the current distribution on the BHA, I(z), and the induced current on the casing, I'(z'), may be calculated using analytic models known in the art, using a numerical model known in the art, or obtained from a database. For example, a database may be created prior to drilling which contains a large number of resistivity variations and different BHA to cased well spacings. During drilling, the resistivity measurements may be transmitted to the surface and used to obtain estimates for the currents from the database.

The previous discussion has been directed toward situations where conductive drilling mud is used, e.g. water-based mud (WBM). Generally, oil-based mud (OBM) is insulating so that current I(z) enters the formation only through the drill bit 121, and then only when the drill bit is on bottom and making good mechanical contact with the formation (FIG. 1). The current in the formation 107 concentrates on the casing 105 and eventually returns to the BHA through stabilizers and drill pipes (not shown) above the insulated gap 108. Because current does not leave the BHA between the insulated gap 108 and the drill bit 121, the current along the BHA may be approximated as the current at the gap: I($z_0$)=I(z)=I(0). The current on the target casing 105 is given by simply by I'($z_0$)=−κ·I($z_0$). Because the current I(z) can only leave the BHA 102 through the drill bit 121, the heterogeneity of the formation 117 does not significantly affect the current on the target casing 105. This expression for I'($z_0$) can be substituted into Equation 6, and the direction and distance to the cased well 104 determined.

In accordance with embodiments disclosed herein, external magnetometers 114 may also be used to improve the signal-to-noise ratio of signals detected by the three-axis magnetometer (shown as 112 in FIG. 1) by providing a reference signal for the internal magnetometer 112. If the distance between the BHA and the cased well is large, such that the casing magnetic field $\vec{B}_1$ 115 is weak, then incoherent noise may reduce the accuracy in locating the casing. However, the magnetic field $\vec{B}_0$ 118 due to the current I(z) will provide a strong signal for the external magnetometer 114. The phase and frequency of the signal from the external magnetometer 114 will be synchronous with the currents I(z) and I'(z'), and hence synchronous with the secondary magnetic field $\vec{B}_1$ 115. Thus, the external magnetometer 114 can provide a synchronous signal for a lock-in detection system to enhance the measurement of $\vec{B}_1$ by the three-axis magnetometer 112.

Figure 12:
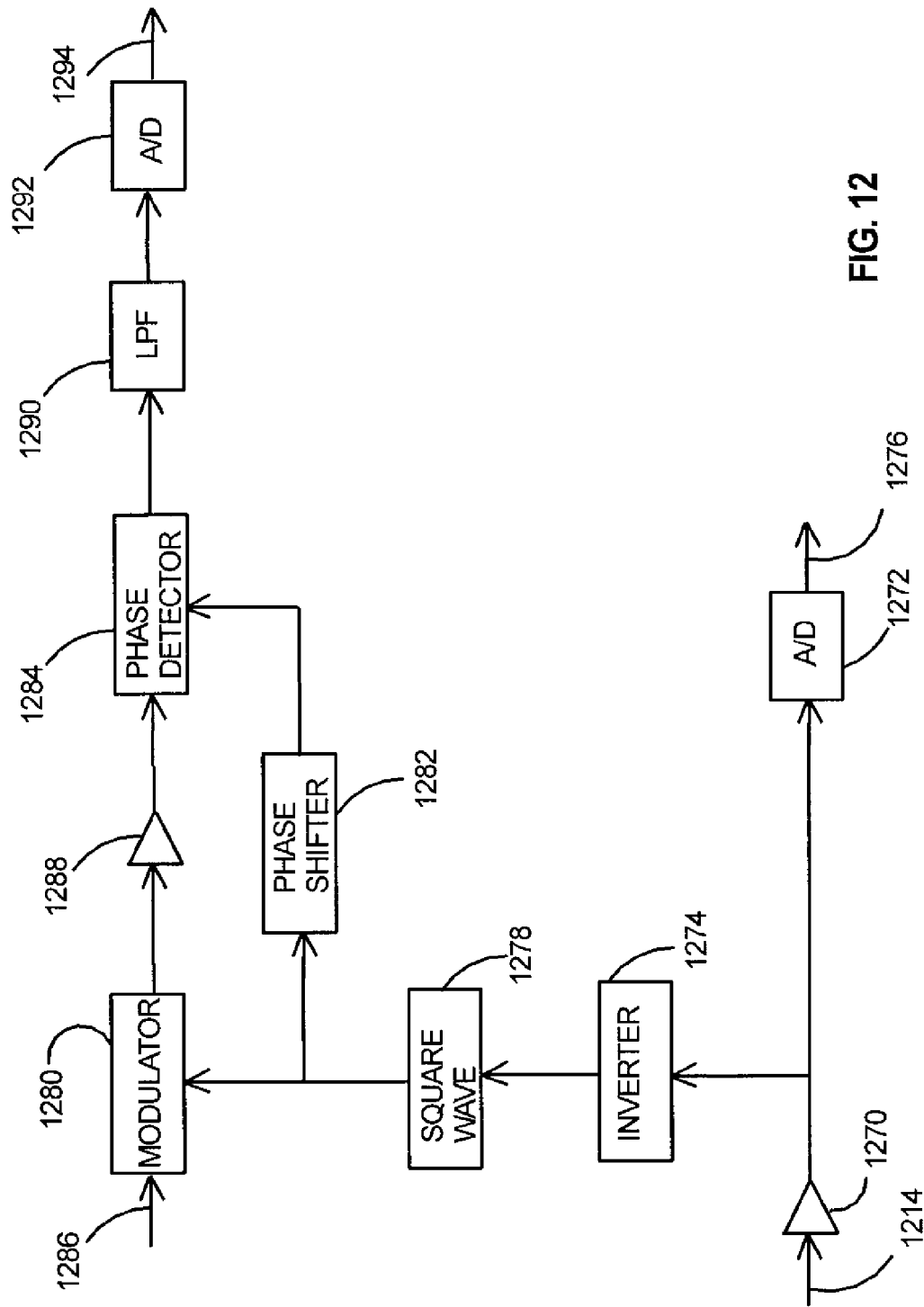
FIG. 12 is a flowchart of an example lock-in detection circuit using external magnetometers.

Lock-in detection is well known to improve the signal-to-noise ratio for incoherent noise and for weak signals. A lock-in detection system for measuring $\vec{B}_1$ is illustrated in FIG. 12. The AC signal from the external magnetometer 1214 is amplified 1270, and the amplifier output feeds an analog-to-digital (A/D) converter 1272 and an inverter 1274. The A/D converter 1272 output is transmitted to a downhole processor 1276, which calculates, for example, the current at the external magnetometer I($z_0$). The inverter output is converted into a square wave reference signal 1278 and then applied to a modulator 1280. The reference square wave is also phase shifted 1282 and drives a phase sensitive detector (PSD) 1284. The signal from the internal magnetometer 1286 is modulated 1280 with the square wave reference signal 1278. The modulator may simply be a set of switches that are controlled by the square wave reference signal 1278. The modulated signal 1280 is amplified 1288 and enters the phase sensitive detector 1284. The PSD 1284 output is low pass filtered 1290 and drives an A/D converter 1292, the output of which is then passed to a processor 1294. The phase shifter 1282 is adjusted to give the largest possible signal. Other methods known in the art for synchronous detection may also be applied to reduce the incoherent noise and to increase the signal-to-noise ratio. For example, the signals from the external magnetometer 114 and from the internal magnetometer 112 may be converted from analog to digital first, transmitted to a downhole processor, and then digital lock-in detection applied to the signals in the processor. The signals from the external magnetometer(s) and the internal magnetometer may also be combined for processing by the lock-in protection system.

A reference signal 1214 for lock-in detection may also be derived directly from circuitry located in E-Pulse 109 and transmitted to sub 120 by direct wiring, by fiber-optic cable, or by electromagnetic waves.

In the case of well interception, such as drilling a relief well, previous locating systems required removal of the BHA from the wellbore and, thereafter, running a wireline magnetic ranging tool to locate the target casing. Then, the BHA is returned to the wellbore to continue drilling operations. Embodiments of the present disclosure may facilitate tracking the location of target casing relative to a wellbore without removing the BHA from the wellbore, thus significantly reducing time, costs and improving the accuracy in drilling the second wellbore.

Figure 13:
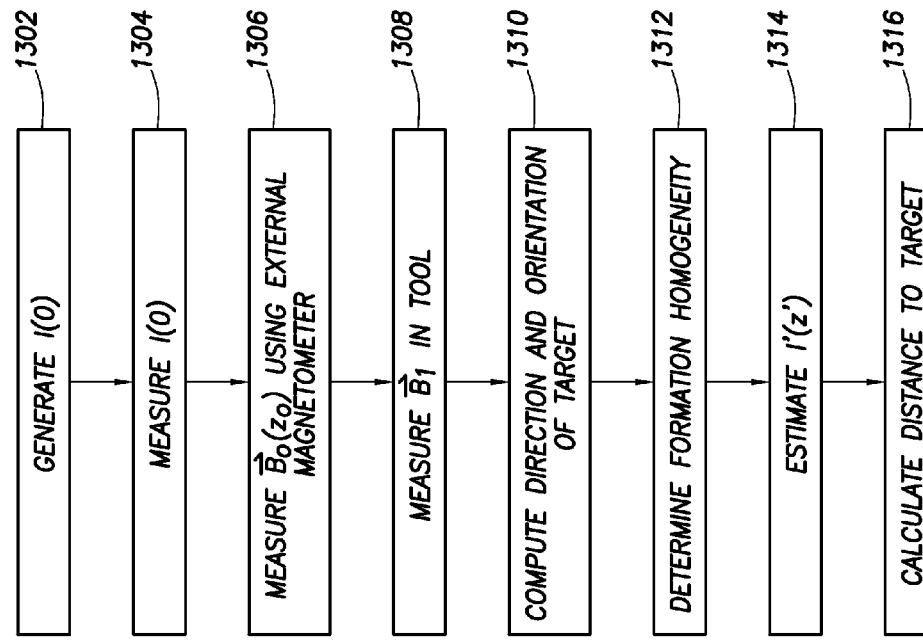
FIG. 13 shows an example method for determining one of a direction and distance to a conductive target.

FIG. 13 shows an example method 1300 for determining at least one of a direction and a distance to a conductive target. The method 1300 is only provided as an example, and as will be apparent from the description, other methods may be possible. For example, some methods may not include every step shown in the method 1300 shown in FIG. 13. Other methods may include steps not shown in FIG. 13. Further, as known in the art, many of the steps may be performed in an order other than the order shown in FIG. 13. Any description of changes in the order is intended to be an example, and not an exhaustive list of the possible permutations of the method.

The method 1300 includes generating a current I(0) at an insulated gap in a downhole tool, at step 1302. In one example, this may be accomplished by applying a potential difference across the gap. In other examples, a current source may be used. Next, the method 1300 may include measuring the current I(0) at the insulated gap, at step 1304. Where a potential difference is applied across the insulated gap, the current generated at the gap may be measured. Where a current source is used, this step may be omitted. In other examples where the current across the insulated gap I(0) is not used in subsequent steps, this step may be omitted.

The method 1300 may include measuring an azimuthal magnetic $B_0^z(z_0)$ field induced about the tool by current flowing along the tool using an external magnetometer, at step 1306. In one example, the external magnetometer corresponds to the external magnetometer 114 shown in FIG. 1. In other examples, two or more external magnetometers may be used. For example, as shown in FIG. 4, two external magnetometers 314a, 314b may be used to measure the azimuthal magnetic field $B_0^z(z_0)$. By using two or more external magnetometers, it may be possible, as described above, to determine and subtract the Earth's magnetic field from the measured values.

The method 1300 may include measuring the magnetic field $B_1^z$ induced by current flowing in the conductive target, at step 1308. In one example, the magnetic field $B_1^z$ may be measured using a three-axis magnetometer internal to the tool. In another example, the magnetometer may be a one-axis or two-axis magnetometer. For example, in a SAGD well, it may be known or assumed that the well being drilled is substantially parallel to the conductive target (in SAGD, the conductive target may be the casing on the parallel well). In such a case, if the magnetometer is being rotated, the magnetic field $B_1^z$ may be measured using a single-axis magnetometer aligned in the plane of the magnetic field $B_1^z$. If the magnetometer is not being rotated, it may be possible to measure the magnetic field $B_1^z$ using a two-axis magnetometer, where the axes are substantially in the plane of the magnetic field $B_1^z$ (e.g., perpendicular to the axis of the well). In another example, a single-axis magnetometer may be used in a rotating tool where the direction and orientation of the conductive target are known. The measurement of the secondary magnetic field may be made by taking the maximum variation of the magnetic field for each rotation.

The method 1300 may include computing the direction and orientation of the conductive target, at step 1310. In one example, this is accomplished using data from the three-axis magnetometer. Because the magnetic field $B_1^z$ is perpendicular to the current flowing on the conductive target, the data from the three-axis magnetometer may be analyzed to determine the direction and orientation of the conductive target with respect to the BHA. In another example, the wellbore may be drilled substantially parallel to the conductive target, for example a SAGD well, and the direction and orientation of the conductive target with respect to the BHA may be assumed. In such a case, this step may be omitted. Where the method is performed to determine the direction and/or the orientation of the conductive target, the method may be stopped.

The method 1300 may include determining the formation homogeneity when drilling with conductive mud, at step 1312. In one example, this is done to determine the distribution of the current along the length of the axis of the BHA. As shown in FIGS. 7A-8B, a heterogeneous formation, where the resistivity of the formation changes between the insulated gap and the drill bit, may cause the current flowing at the gap and at other positions along the BHA to be different than would be expected in a homogeneous formation. In some examples, the resistivity of the formation may be known, and this step may be omitted. In other examples, the method may be performed without this step, and acceptable results may nevertheless be obtained.

In one example, the formation homogeneity may be determined when drilling with conductive mud by evaluating the equations 7 or 7a, above. When the condition in equation 7 or 7a is true, the formation may be substantially homogeneous. If the condition in equation 7 or 7a is not true, equations 8 or 8a and 9 or 9a may be evaluated to determine whether the BHA is entering a more resistive zone or a less resistive zone, as is described above with reference to FIGS. 7A-8B.

The method 1300 may include estimating the current on the conductive target I'(z'), at step 1314. In one example, it may be assumed that the current on the conductive target is substantially the same as the current flowing on the BHA at the point of the external magnetometer times a constant K, $I'(z_0)=-\kappa \cdot I(z_0)$. This is because the conductive target provides a substantially lower resistance than the surrounding the formation, and therefore a significant portion of the current will return on the conductive target.

In another example, the current on the conductive target $I'(z')$ may be estimated by using a pre-constructed database that estimates the current on the conductive target $I'(z')$ based on the measured magnetic fields and the current on the BHA. Such a database may also be based on the resistivity profile of the formation.

In other examples, described below, this step may be omitted when the step of calculating the distance to the target casing is combined with determining the current on the conductive target $I'(z')$.

The method 1300 may include calculating the distance to the conductive target, at step 1316. In one example, this may be done using equation 6, above. Where the current on the conductive target $I'(z')$ is known, for example by using a pre-constructed database or by assuming that $I'(z_0)=-\kappa \cdot I(z_0)$ the value for the current on the conductive target $I'(z')$ evaluated at $z'=z_0$ may be used in equation 6. The magnetic field $\vec{B}_1$ may also be used, and equation 6 may be solved for the distance r. This may be done based on the measurement of $\vec{B}_1$ using the internal magnetometer located within the tool. For example, $\vec{B}_1$ may be measured using a three-axis magnetometer. In another example, such as a SAGD application where the conductive target is substantially parallel to the BHA, the magnetic field $\vec{B}_1$ may be measured using a one-axis or two-axis magnetometer.

In another example, the current on the conductive target $I'(z')$ is not known or estimated. In this situation, an expression for the current on the conductive target $I'(z')$ may be substituted into an expression for the distance. For example, equation 4 or equation 5 may be substituted into equation 6, which may then be solved for the distance to the conductive target r. As described above, equation 5 represents a special case where the wellbore being drilled known to be substantially parallel to the conductive target, and equation 4 represents a more general case. It is noted that equations 4 and 5 are provided as examples, and other equations may be derived.

FIG. 14 shows an example method 1400 for determining the resistivity of the formation. The method includes generating a current across an insulated gap $I(0)$, at step 1402. This may be done in the same manner explained above with respect to step 1302 in FIG. 13. The method 1400 may include measuring an azimuthal magnetic $\vec{B}_0(z_0)$ field induced about the tool by current flowing along the tool using an external magnetometer, at step 1404. In one example, the external magnetometer corresponds to the external magnetometer 114 shown in FIG. 1. In other examples, two or more external magnetometers may be used. For example, as shown in FIG. 4, two external magnetometers 314a, 314b may be used to measure the azimuthal magnetic field $\vec{B}_0(z_0)$.

The method 1400 may include calculating the current $I(z_0)$ flowing past the external magnetometer, at step 1406. In one example, the calculation may include using the measured azimuthal magnetic field $\vec{B}_0(z_0)$ in equation 1, above.

The method 1400 may include measuring the potential difference $(V_1-V_2)$ across the insulated gap, at step 1408. The method 1400 may include computing the resistivity of the formation, at step 1410. The resistivity may be determined using a current value, for example $I(0)$ or $I(z_0)$, and the potential difference $(V_1-V_2)$ across the insulated gap. In one example, this may be done using the equation $R=K(V_1-V_2)/I(0)$, where $I(0)$ is the current flowing at the insulated gap. In another example, the current $I(z_0)$ flowing past the external magnetometer and equation 11 may be used for a higher resolution resistivity estimate.

Another example of a method 1500 is shown in FIG. 15. The method 1500 includes generating a current $I(0)$ at an insulated gap in a downhole tool, at step 1502. In one example, this may be accomplished by applying a potential difference $(V_1-V_2)$ across the gap. In other examples, a current source may be used. Next, the method 1500 may include measuring the current $I(0)$ at the insulated gap or measuring the potential difference $(V_1-V_2)$ at the gap, at step 1504. Where a potential difference $(V_1-V_2)$ is applied across the insulated gap, the potential difference $(V_1-V_2)$ is known and the current generated at the gap $I(0)$ may be measured. Where a current source is used, the current $I(0)$ is known and the potential difference $(V_1-V_2)$ may be measured.

The method 1500 may include measuring an azimuthal magnetic $\vec{B}_1(z_0)$ field induced about the tool by current flowing along the tool using an external magnetometer, at step 1506. In one example, the external magnetometer corresponds to the external magnetometer 114 shown in FIG. 1. In other examples, two or more external magnetometers may be used. For example, as shown in FIG. 4, two external magnetometers 314a, 314b may be used to measure the azimuthal magnetic field $\vec{B}_0(z_0)$. By using two or more external magnetometers, it may be possible, as described above, to determine and subtract the Earth's magnetic field from the measured values. In some examples, the Earth's magnetic field may also be subtracted from the measurement of the magnetic field $\vec{B}_1$ induced by current flowing in the conductive target, described below.

The method 1500 may include calculating the current flowing past the external magnetometer $I(z_0)$, at step 1508. In one example, the calculation may include using the measured azimuthal magnetic field $\vec{B}_1(z_0)$ in equation 1, above.

The method 1500 may include measuring the magnetic field $\vec{B}_1$ induced by current flowing in the conductive target, at step 1510. In one example, the magnetic field $\vec{B}_1$ may be measured using a three-axis magnetometer internal to the tool. In another example, the magnetometer may be a single or two-axis magnetometer. For example, in a SAGD well, it may be known or assumed that the well being drilled is substantially parallel to the conductive target (in SAGD, the conductive target may be the casing on the parallel well). In such a case, if the magnetometer is being rotated, the magnetic field $\vec{B}_1$ may be measured using a single-axis magnetometer aligned in the plane of the magnetic field $\vec{B}_1$. If the magnetometer is not being rotated, it may be possible to measure the magnetic field $\vec{B}_1$ using a two-axis magnetometer, where the axes are substantially in the plane of the magnetic field $\vec{B}_1$ (e.g., perpendicular to the axis of the well). In another example, a single-axis magnetometer may be used in a rotating tool where the direction and orientation of the conductive target are known. The measurement of the secondary magnetic field may be made by taking the maximum variation of the magnetic field for each rotation.

The method 1500 may include computing the direction and orientation of the conductive target, at step 1512. In one example, this is accomplished using data from the three-axis magnetometer. Because the magnetic field $B_1^\sim$ is perpendicular to the current flowing on the conductive target, the data from the three-axis magnetometer may be analyzed to determine the direction and orientation of the conductive target with respect to the BHA. In another example, the wellbore may be drilled substantially parallel to the conductive target, for example a SAGD well, and the direction and orientation of the conductive target with respect to the BHA may be assumed.

The method 1500 may include determining the formation homogeneity, at step 1514. In one example, this is done to determine the distribution of the current along the length of the axis of the BHA. As shown in FIGS. 7A-8B, a heterogeneous formation, where the resistivity of the formation changes between the insulated gap and the drill bit, may cause the current flowing at the gap and at other positions along the BHA to be different than would be expected in a homogeneous formation. In some examples, the resistivity of the formation may be known, and this step may be omitted. In other examples, the method may be performed without this step, and acceptable results may nevertheless be obtained.

In one example, the formation homogeneity may be determined by evaluating the equation 7 (or 7a), above. When the condition in equation 7 is true, the formation may be substantially homogeneous. If the condition in equation 7 (or 7a) is not true, equations 8 and 9 (or 8a and 9a) may be evaluated to determine whether the BHA is entering a more resistive zone or a less resistive zone, as is described above with reference to FIGS. 7A-8B.

The method 1500 may include computing the resistivity of the formation, at step 1516. The resistivity may be determined using the measured or known currents and the potential difference ($V_1-V_2$) across the insulated gap. In one example, this may be done using the equation $R=K(V_1-V_2)/I(0)$, where $I(0)$ is the current flowing at the insulated gap. In another example, the current flowing past the external magnetometer $I(z_0)$ and equation 11 may be used for a higher resolution resistivity estimate.

In still another example, the BHA may include a resistivity tool, and the resistivity of the formation may be measured using the resistivity tool. Many resistivity tools are known in the art. If a resistivity tool is used, this step may include determining the resistivity using the tool. In addition, if the potential difference ($V_1-V_2$) across the insulated gap is not otherwise used in methods for locating a conductive target, step 1504, above, may be omitted if the current at the insulated gap $I(0)$ is known.

In some examples, the method 1500 may include creating a log of formation resistivity vs. depth. This step is not specifically shown in FIG. 15. Alternatively, a log of the formation resistivity may be available from earlier measurements made in the cased well. For example, formation resistivity surrounding the cased well may have been obtained when the well was being drilled using logging while drilling or before it was cased using wireline measurements. Prior measurements of formation resistivity may be used to determine formation heterogeneity.

The method 1500 may include estimating the current on the conductive target $I'(z')$, at step 1518. In one example, it may be assumed that the current on the conductive target is substantially the same as the current flowing on the BHA at the point of the external magnetometer times a constant, $\kappa$. This is because the conductive target provides a substantially lower resistance than the surrounding the formation and a significant portion of the current will return on the conductive target.

In another example, the current on the conductive target $I'(z')$ may be estimated by using a pre-constructed database that estimates the current on the conductive target $I'(z')$ based on the resistivity of the formation and the current measured on the BHA, i.e. at least one of $I(0)$ and $I(z_0)$. In some examples, the resistivity of the formation may include a log of resistivity vs. depth that may be used in the database or may compared to other resistivity logs, for example from nearby wells.

In other examples, described below, this step may be omitted when the step of calculating the distance to the target casing is combined with determining the current on the conductive target $I'(z')$.

The method 1500 may include calculating the distance to the conductive target, at step 1520. In one example, this may be done using equation 6, above. Where the current on the conductive target $I'(z')$ is known, for example by using a pre-constructed database, the value for the current on the conductive target $I'(z')$ may be used in equation 6. The magnetic field $B_1^\sim$ may also be used, and equation 6 may be solved for the distance r. This may be done based on the measurement of $B_1^\sim$ using the magnetometer located within the tool. For example, $B_1^\sim$ may be measured using a three-axis magnetometer. In another example, such as a SAGD application where the conductive target is substantially parallel to the BHA, the magnetic field $B_1^\sim$ may be measured using a one or two-axis magnetometer.

In another example, the current on the conductive target $I'(z')$ is not known or estimated. In this situation, an expression for the current on the conductive target $I'(z')$ may be substituted into an expression for the distance. For example, in conductive mud, equation 4 or equation 5 may be substituted into equation 6, which may then be solved for the distance to the conductive target r. As described above, equation 5 represents a special case where the wellbore being drilled known to be substantially parallel to the conductive target, and equation 4 represents a more general case. In non-conductive mud, equation 10 or $I'(z')=I(0)$ may be used. It is noted that equations 4, 5 and 10 are provided as examples, and other equations may be derived.

Advantageously, embodiments disclosed herein may provide improved methods and apparatus for improved accuracy in detecting and locating casing while drilling. Additionally, embodiments disclosed herein may provide improved methods of estimating the current on an adjacent casing. Further, embodiments disclosed herein may provide improved resistivity measurements, reference signals for lock-in detection, and improved signal-to-noise ratio.

Other examples are possible. For example, the target might be an oil or gas well with a casing or a liner, a drill string, drill pipe, or any metal pipe. While the invention has been described with application to drilling for oil and gas, it can also be applied to drilling under rivers, roads, towns or cities to place water, gas, or electric pipelines. An example of the later application is safely placing a new water pipe a predetermined distance from an existing water pipe.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A wellbore tool, comprising:
a tool body configured to move in a borehole;
an electric current driving device having an insulated gap disposed on the tool body, wherein the electric current driving device is configured to generate an electric current across the insulated gap; and
at least one external magnetometer disposed on an outer wall of the tool body, wherein the at least one external magnetometer comprises a first external magnetometer and a second external magnetometer positioned about 180° away from the first external magnetometer on the outer wall of the tool body.

2. The wellbore tool of claim 1 further comprising an internal magnetometer disposed within the tool, proximate the first external magnetometer.

3. The wellbore tool of claim 2, further comprising a lock-in detection system configured to accept signals from the at least one external magnetometer and the internal magnetometer.

4. The wellbore tool of claim 1, wherein the tool body has a recess formed on an outer wall configured to receive the at least one external magnetometer.

5. The wellbore tool of claim 1, further comprising a hollow tubular disposed between the electric current driving device and the at least one external magnetometer.

6. A wellbore tool, comprising:
a tool body configured to move in a borehole, the tool body including a drill collar;
an electric current driving device having an insulated gap disposed on the tool body, wherein the electric current driving device is configured to generate an electric current across the insulated gap; and
at least one external magnetometer disposed on an outer wall of the tool body, wherein the drill collar comprises at least one recess formed on a portion of the outer wall configured to receive the at least one external magnetometer.

7. The wellbore tool of claim 6, further comprising a hollow tubular disposed between the electric current driving device and the at least one external magnetometer.

8. The wellbore tool of claim 6, further comprising an internal magnetometer disposed within the tool, proximate the at least one external magnetometer.

9. The wellbore tool of claim 8, further comprising a lock-in detection system configured to accept signals from the at least one external magnetometer and the internal magnetometer.

* * * * *